(12) United States Patent
Monteil et al.

(10) Patent No.: US 8,709,318 B2
(45) Date of Patent: Apr. 29, 2014

(54) METHOD AND APPARATUS FOR BELLING PLASTIC PIPE

(75) Inventors: Guillermo Monteil, San Jose (CR); Samuel Gjorven, San Jose (CR)

(73) Assignee: S & B Technical Products, Inc., Fort Worth, TX (US)

( * ) Notice: Subject to any disclaimer, the term of this patent is extended or adjusted under 35 U.S.C. 154(b) by 609 days.

(21) Appl. No.: 12/979,848

(22) Filed: Dec. 28, 2010

(65) Prior Publication Data

US 2011/0156312 A1 Jun. 30, 2011

Related U.S. Application Data

(60) Provisional application No. 61/291,086, filed on Dec. 30, 2009.

(51) Int. Cl.
*B29C 51/42* (2006.01)

(52) U.S. Cl.
USPC ............ 264/248; 264/237; 264/322; 264/259

(58) Field of Classification Search
USPC .......... 264/237, 248, 322, 510; 425/392–393, 425/403, DIG. 218
See application file for complete search history.

(56) References Cited

U.S. PATENT DOCUMENTS

| | | | | |
|---|---|---|---|---|
| 3,377,659 A * | 4/1968 | Hucks, Jr. | | 425/392 |
| 4,030,872 A * | 6/1977 | Parmann | | 425/393 |
| 4,032,282 A | 6/1977 | Wilson et al. | | |
| 4,061,459 A * | 12/1977 | Parmann | | 425/403 |
| 4,120,521 A * | 10/1978 | Parmann | | 285/113 |
| 4,336,014 A | 6/1982 | Parmann | | |
| 4,386,045 A * | 5/1983 | Vaisanen | | 264/249 |
| 4,427,219 A * | 1/1984 | Madej | | 285/249 |
| 4,625,383 A * | 12/1986 | Vassallo et al. | | 29/445 |
| 4,723,905 A * | 2/1988 | Vassallo et al. | | 425/392 |
| 4,826,028 A * | 5/1989 | Vassallo et al. | | 277/615 |
| 5,855,930 A * | 1/1999 | Savioli | | 425/387.1 |
| 5,928,451 A | 7/1999 | Johansson et al. | | |
| 5,988,695 A * | 11/1999 | Corbett, Jr. | | 285/110 |
| 6,033,617 A * | 3/2000 | Guzowski | | 264/516 |
| 6,113,159 A * | 9/2000 | Corbett, Jr. | | 285/345 |
| 6,152,494 A | 11/2000 | Corbett, Sr. et al. | | |
| 6,328,309 B1 | 12/2001 | Corbett, Jr. | | |
| 6,328,609 B1 * | 12/2001 | Ezawa et al. | | 439/676 |
| 6,383,435 B2 * | 5/2002 | Savioli et al. | | 264/230 |
| 6,676,886 B2 * | 1/2004 | Corbett, Jr. | | 264/571 |
| 6,947,443 B1 * | 9/2005 | Corbett, Jr. | | 370/451 |
| 7,134,204 B2 * | 11/2006 | Corbett et al. | | 29/890.14 |
| 7,284,310 B2 * | 10/2007 | Jones et al. | | 29/447 |
| 7,537,248 B2 * | 5/2009 | Jones et al. | | 285/339 |
| 7,618,071 B2 * | 11/2009 | Jones et al. | | 285/343 |
| 7,731,884 B2 * | 6/2010 | Knapp et al. | | 264/259 |
| 7,845,686 B2 * | 12/2010 | Steinbruck | | 285/321 |
| 8,056,334 B2 * | 11/2011 | Corbett, Jr. | | 60/516 |
| 8,444,186 B2 * | 5/2013 | Jones et al. | | 285/339 |
| 2006/0119100 A1 * | 6/2006 | Jones et al. | | 285/374 |

\* cited by examiner

*Primary Examiner* — Matthew Daniels
*Assistant Examiner* — Saeed Huda
(74) *Attorney, Agent, or Firm* — Charles D. Gunter, Jr.

(57) ABSTRACT

An improved pipe belling process is shown which features a mandrel having a specially designed backup or forming collar. The backup collar has an outer contact surface which forms an undulating pattern when viewed in cross section. The undulating surface reduces the contact area between the outer contact surface of the collar and the lip region of a plastic pipe being belled, thereby lowering the coefficient of friction that exists between the pipe lip region and the collar.

10 Claims, 4 Drawing Sheets

METHOD AND APPARATUS FOR BELLING PLASTIC PIPE

CROSS-REFERENCE TO RELATED APPLICATION

The present application claims priority from Provisional Application Ser. No. 61/291,086, filed Dec. 30, 2009, entitled "Method and Apparatus for Belling Plastic Pipe," by the same inventors.

BACKGROUND OF THE INVENTION

1. Field of the Invention

The present invention relates generally to the field of pipe connections, and in particular, to an improved belling process and apparatus useful therein for installing a gasket in a bell or socket end of a thermoplastic pipe.

2. Description of the Related Art

Pipes formed from thermoplastic materials including polyethylene and PVC are used in a variety of industries. For example, pipes are commonly used in the municipal waterworks industry for the conveyance of fluids such as water and sewage. It is well known in the art to extrude plastic pipes of this type in an elongated cylindrical configuration of a desired diameter and to then cut the extruded product into individual lengths of convenient size suitable for handling, shipping and installing. Each length of pipe is enlarged or "belled" at one end sufficiently to join or connect with the next adjacent pipe section by inserting an unenlarged or "spigot" male end of the next adjacent length of pipe into the enlarged bell pipe end. The inside diameter of the bell is formed sufficiently large to receive the spigot end in telescoping fashion.

Some form of sealing element or composition must be used to form a secure connection between the male and female pipe ends. For this purpose, an annular, elastomeric ring or gasket is typically present within a groove formed in the bell, socket end of the thermoplastic pipe. As the spigot is inserted within the socket, the gasket provides the major seal capacity for the joint. It is critical, during the installation process, that the gasket not be able to twist or flip since a displaced or dislocated gasket will adversely affect the ultimate sealing capacity of the joint.

In some instances in the past, the sealing gasket was installed in the groove of a bell pipe end after the bell end had previously been manufactured with such a groove at the pipe manufacturing facility. In other words, the gasket was installed in a post pipe manufacturing operation. However, in the early 1970's, a new technology was developed by Rieber & Son of Bergen, Norway, referred to in the industry as the "Rieber Joint." The Rieber system provided an integral sealing mechanism within the belled or female pipe end for sealing with the spigot end of a mating pipe formed from thermoplastic material. In the Rieber process, the elastomeric gasket was inserted within an internal groove in the socket end of the female pipe as the female or belled end was simultaneously being formed. In other words, the gasket was installed simultaneously as a part of the pipe manufacturing operation rather than as a post manufacturing operation. The provision of a prestressed and anchored elastomeric gasket during the belling process at the pipe factory provided an improved socket end for a pipe joint by providing a sealing gasket which would not twist or flip or otherwise allow impurities to enter the sealing zones of the joint. This increased the reliability of the joint and decreased the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682.

In the previously described Rieber process, the gasket is installed upon the outer working surface of a mandrel and abuts a backup collar which helps to position and retain the gasket during the subsequent belling operation. In many cases, it is necessary to heat the collar so that the lip region of the female pipe will not buckle. A cold back up collar accepts heat from the bell lip region. As the lip region cools, there is an increase in the coefficient of friction between the bell lip region and the collar. This increase in friction can cause buckling of the collar as the collar cools and the mandrel is withdrawn. While heated back up collars have been used in the past satisfactorily, the heating aspect of the collar adds to the cost and complexity of the tooling.

Thus, despite the advances in the art as described above, a need continues to exist for further advances in the technology. For example, it would be advantageous to develop a back up collar of the type described which eliminates the need for heat during the pipe belling operation.

SUMMARY OF THE INVENTION

It is therefore an object of the present invention to provide a back up collar for a pipe belling operation of the type described which does not require heating of the outer contact surface of the collar during the belling operation.

Another object of the invention is to provide a modified backup collar for a belling mandrel of the type described which does not require drastic modification of the existing belling mandrel and which can, therefore, be applied to a variety of existing belling mandrels.

Another object of the invention is to provide such an improved backup collar for a pipe belling mandrel which is simple in design and economical to manufacture.

These objects and others are accomplished in the method of the invention, the method being used for belling a plastic pipe while simultaneously installing a gasket in a socket end of the pipe. In the method of the invention, a mandrel is provided with an inner end and an outer end and having a generally cylindrical outer working surface. A gasket is installed at a first circumferential position on the outer working surface of the mandrel. A backup collar is provided at a second circumferential location on the mandrel, the backup collar having an exposed lip portion which abuts the gasket and an outer contact surface which receives and supports a bell lip region of the pipe being belled. The backup collar has a specially formed outer contact surface which reduces the surface area of the interface between the bell lip region of the pipe and the collar. This is accomplished by providing the backup collar with a specially designed, undulating outer contact surface.

The mandrel is the preferred form of the invention designed to receive a gasket which itself comprises an annular forming and sealing element including a body of elastically yieldable material defining an annular sealing portion having an inner diameter on an interior surface thereof, the gasket also having a rigid relatively non-elastic retainer element disposed within said body. The mandrel preferably has a groove formed on the outer working surface thereof which forms a peripheral anchoring surface for the sealing portion of the gasket which is sized to receive said sealing portion therein in deformed relation to anchor said element to said mandrel in fixed relation.

The socket end of the thermoplastic pipe is heated and forced over the working surface of the mandrel and over the gasket and backup collar, whereby the heated socket end of the thermoplastic pipe flows over the gasket to form a retention groove for retaining the gasket. The backup collar is then retracted and the socket end of the pipe is cooled. The socket end of the pipe with its retained gasket can then be retracted from the working surface of the mandrel.

In one preferred form of the invention, the undulating surface on the outer contact surface of the backup collar forms a series of crests and troughs when viewed in cross section. In another form of the invention, the undulating surface is a series of V-shaped threads when viewed in cross section. Most preferably, the undulating surface on the outer contact surface of the backup collar forms a series of evenly spaced waves with crests and troughs when viewed in cross section, and wherein there is an even spacing between troughs defined between mid-points of the troughs, the spacing between mid points being in the range from about 3-20 mm. In this preferred form of the invention, the crests of the spaced waves have a given width, the width being in the range from about 0.01 and 8 mm. The waves also have a crest height as measured from an adjacent wave trough, the crest height being in the range from about 0.3-3.0 mm. The preferred wave troughs are defined as arcuate surfaces located between adjacent wave crests in cross section, the arcuate surfaces being drawn on a radius which ranges from about 3-50 mm.

Additional objects, features and advantages will be apparent in the written description which follows.

DETAILED DESCRIPTION OF THE PREFERRED EMBODIMENT

Figure 1:
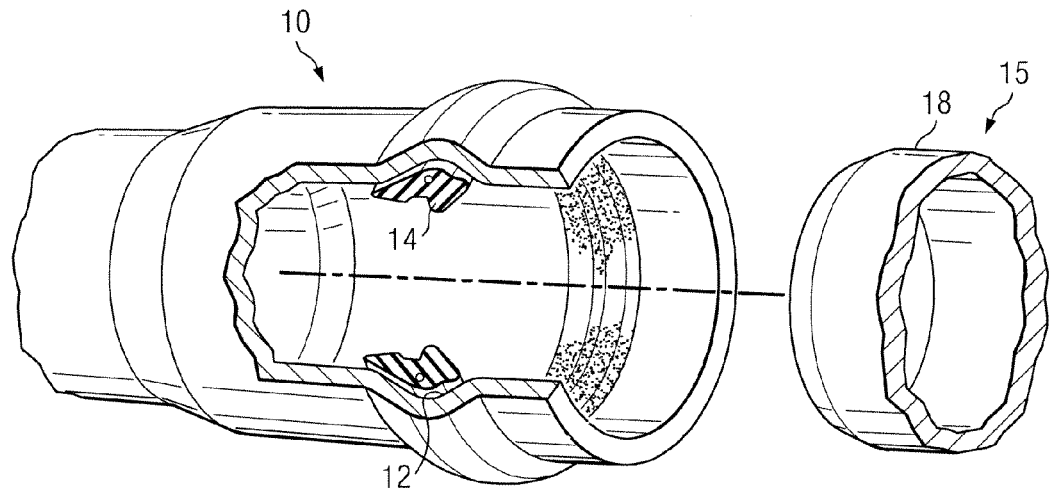
FIG. 1 is a perspective view, partly broken away, of male and female pipe sections about to be made up into a pipe coupling.

Turning to FIG. 1, there is shown an exploded view of a plastic pipe joint in which a belled female pipe end 10 is provided with an annular groove 12 into which is received a sealing gasket 14. The pre-installed sealing gasket 14 is capable of joining and sealing the female plastic pipe 10 to the spigot end of a mating male plastic pipe section 15 having an exterior surface 18. The plastic pipe male and female ends 10, 15 can be made from any convenient synthetic material including the polyolefins such as polyethylene and polypropylene but are preferably made from polyvinyl chloride (PVC).

In the discussion which follows, the terms "female pipe end," "socket end," and "bell end" will sometimes be used interchangeably and will be understood to mean the enlarged pipe end having an end opening of sufficient diameter to receive the mating male or "spigot pipe end" in telescoping fashion in order to form a pipe joint.

In order to explain the manufacturing process used to install the sealing gasket within the mating groove provided in the female pipe end 10, it is necessary to briefly explain the prior art "Rieber" process for plastic pipe manufacture that was briefly described in the Background of the Invention. As previously described, in the Rieber process, the elastomeric gasket was installed within a simultaneously formed internal groove in the socket end of the female pipe during the pipe belling process. The provision of a prestressed and anchored elastomeric gasket during the belling process at the pipe factory provided an improved socket end for a pipe joint with a sealing gasket which would not twist or flip or otherwise allow impurities to enter the sealing zones of the joint, thus increasing the reliability of the joint and decreasing the risk of leaks or possible failure due to abrasion.

Figure 2:
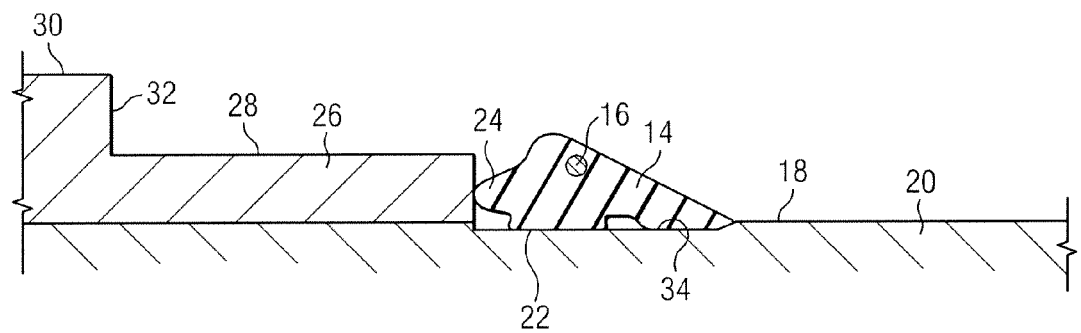
FIGS. 2-5 are simplified, schematic views of the prior art Rieber pipe belling process used to form the female, belled pipe end.

The relevance of the Rieber process to Applicant's invention can perhaps best be appreciated with reference to the description of the prior art process shown in FIGS. 2-5. FIG. 2 shows a section of a conventional elastomeric sealing gasket 14 having a steel reinforcing ring 16, the gasket 14 being seated in place on the generally cylindrical outer working surface 18 of the mandrel 20 used in the belling process. The elastomeric gasket 14 can be formed of, for example, SBR rubber and is a ring shaped, circumferential member having an inner compression surface 22 and an exposed nose portion 24 which, as shown in FIG. 2, abuts a forming collar 26, referred to herein as the "backup collar." The backup collar 26 has a first generally cylindrical extent 28 which is joined to a second cylindrical extent 30 by a step region or shoulder 32, whereby the second extent 30 is of greater external diameter than the first cylindrical extent 28, shown in FIG. 2.

In the Rieber process, the mandrel is therefore designed to receive a gasket which itself comprises an annular forming and sealing element. In other words, the ultimate sealing component is itself used during the pipe manufacturing process as a forming element, as well. The forming mandrel has a groove formed on the outer working surface thereof which forms a peripheral anchoring surface for the sealing portion of the gasket which is sized to receive said sealing portion therein in deformed relation to anchor said element to said mandrel in fixed relation.

As has been explained briefly in the Background discussion, the first cylindrical extent 28 of the backup collar forms an outer contact surface for the lip region of a plastic pipe being belled, as will be explained in greater detail below. The backup collar has traditionally been heated by a supplemental heat source, for example, by electric resistance wiring.

In the first step of the prior art process, the steel reinforced elastomeric gasket 14 is placed onto the working surface of the mandrel 20 and pushed to a position against the back-up or foaming collar 26 (see FIG. 2). The inner circumferential region of the gasket is received within a recess region 34 on the working surface of the mandrel 20 in order to further secure the gasket in position. In this position, the gasket is firmly anchored to the mandrel surface with the rubber between the mandrel and the steel-ring of the gasket being compressed by approximately 20%.

Figure 3:
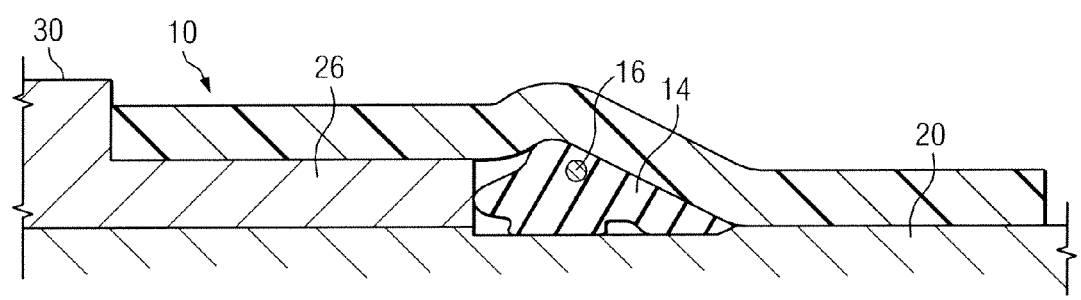

In the second step of the prior art process shown in FIG. 3, the socket end 10 of the thermoplastic pipe is heated and pushed over the steel mandrel 20, gasket 14 and backup collar 26. The socket end 10 is expanded due to the thermoplastic nature of the pipe. A number of thermoplastic materials, such as polyethylene, polypropylene and polyvinylchloride (PVC) are known in the prior art having the required expansion characteristics, depending upon the end application of the pipe joint. However, the preferred material for this application is PVC due to its expansion and contraction characteristics. The socket end 10 flows over the first cylindrical extent 28 of the backup collar 26 and abuts the step region 32 in the second step of the process. Note that the pipe end is deformed by the presence of the gasket 14 so that a gasket receiving groove (12 in FIG. 10) is formed with the pipe I.D., of the female, belled pipe end.

It is at this point in the process that a supplemental heat source has traditionally been necessary to heat the backup collar 26, or at least the outer contact surface (28 in FIG. 4) thereof. Otherwise, a cold backup collar would accept heat from the lip region of the female socket end 10, thereby increasing the coefficient of friction between the two surfaces, increasing the tendency of the socket end to buckle.

In the next step of the prior art process (FIG. 4B) the mandrel and pipe move away from the backup collar 26 and the pipe socket end 10 retracts around the mandrel and gasket 14 due to the elastic forces of the thermoplastic material. Typically, vacuum was also applied through ports (not shown) which connected the mandrel working surface with a vacuum source (not shown).

Figure 5:
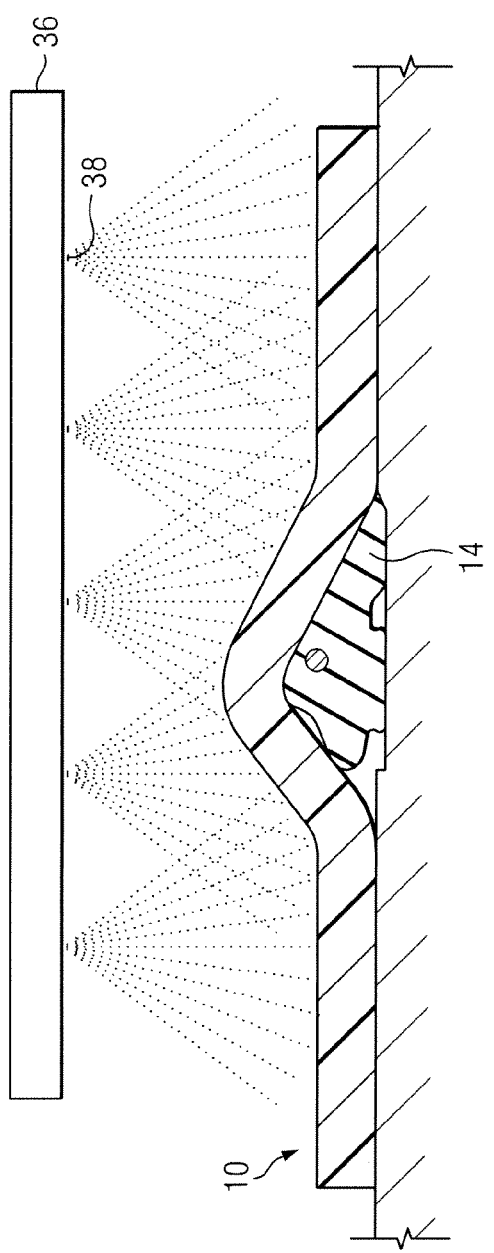

In the final step of the prior art process shown in FIG. 5, the pipe socket end 10 is cooled by means of a water spray bar 36 and spray nozzles 38. As the cooling takes place, the pipe socket end 10 shrinks around the gasket 14, thus compressing the rubber body of the gasket between the steel reinforcing ring 16 and the socket-groove to establish a firm seal. The above described Rieber process has been in commercial use since the early 1970's and is described in the above referenced issued United States patents, among other sources. It will thus be well familiar to those skilled in the thermoplastic pipe sealing arts.

Figure 4:
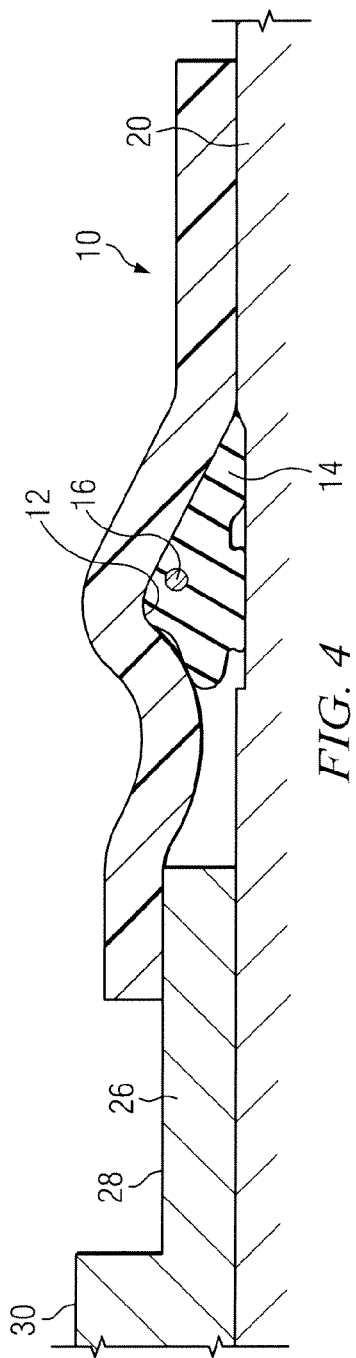
Figure 6:
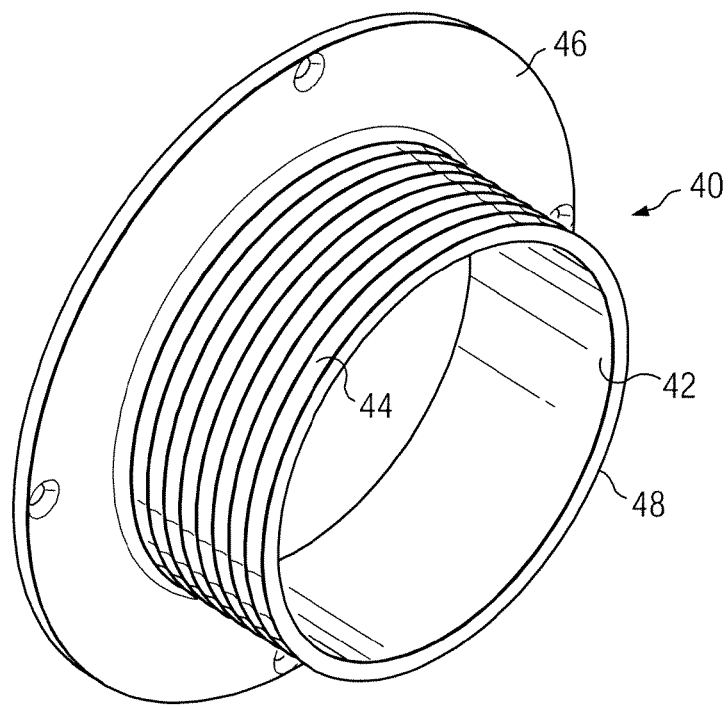
FIG. 6 is a perspective view of the improved backup collar used in the belling method of the invention.
Figure 7:
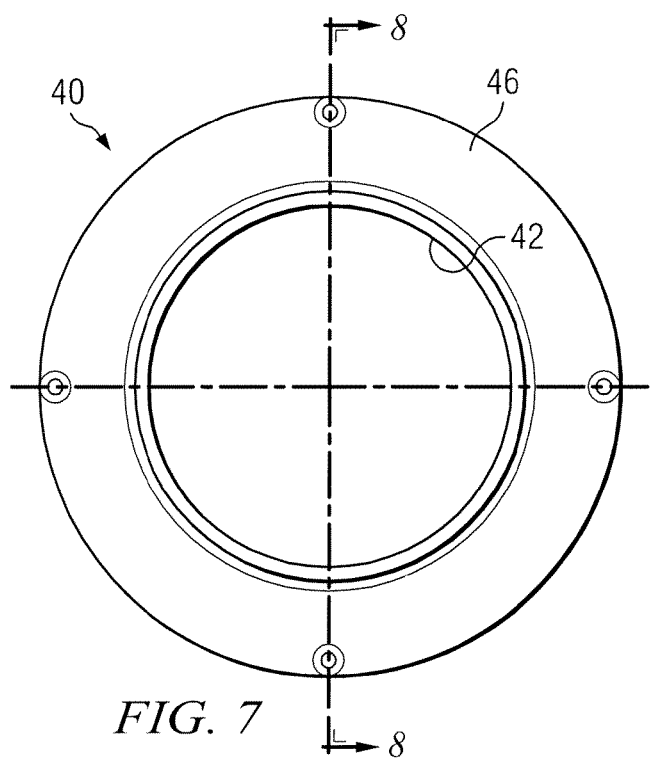
FIG. 7 is frontal view of the backup collar of FIG. 6.

As is apparent from FIGS. 2-4 and the above discussion, the prior art backup collar 26 had an outer circumferential contact surface (28 in FIG. 2) which was a generally smooth, uniform cylindrical surface. FIG. 6 is a perspective view of the redesigned backup collar of the invention, designated generally as 40. The new collar 40 has a cylindrically shaped internal diameter 42 which is received about the exterior diameter of the forming mandrel (20 in FIG. 2). A first, generally cylindrical outer extent 44 terminates in a shoulder region 46 of the backup collar. An outer lip region 48 is provided which abuts a nose region of the sealing gasket to retain the gasket in place on the working surface of the mandrel.

Figure 8:
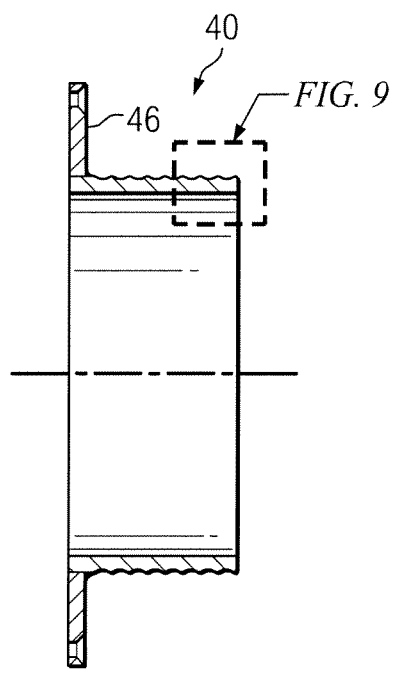
FIG. 8 is a cross sectional view, taken along lines 8-8 in FIG. 7.
Figure 9:
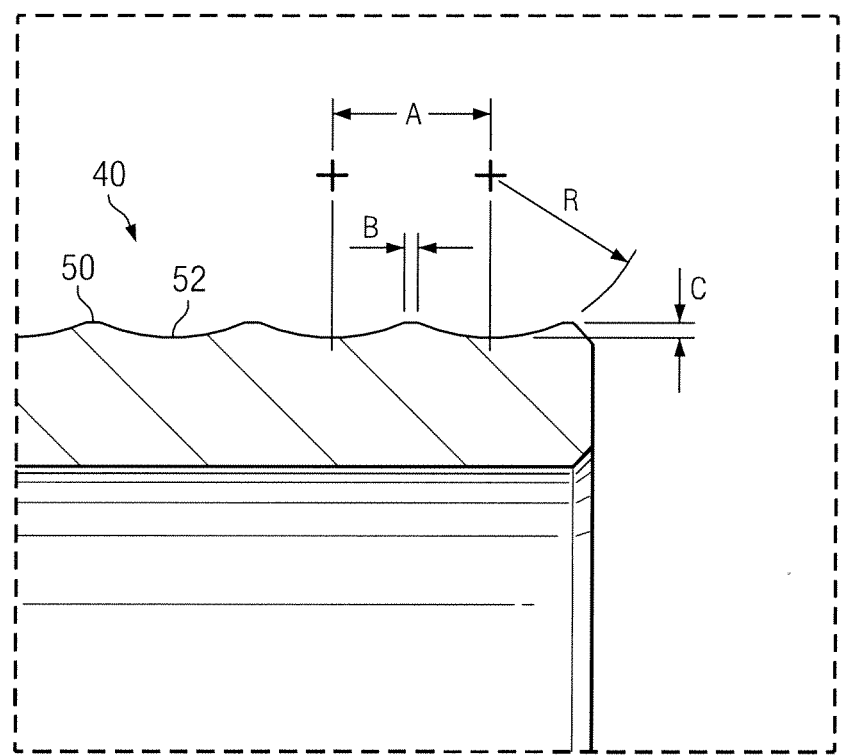
FIG. 9 is an enlarged view of the end region of the backup collar cross section indicated by the dotted square in FIG. 8.

Now, with reference to FIGS. 8 and 9, it will be appreciated that the outer contact surface 44 of the improved backup collar of the invention is not a smooth, uniform cylindrical surface, as in the prior, but rather is provided with an undulating shape. It is the undulating shape which reduces the surface area of the interface between the female pipe bell lip region and the contact surface area of the collar during the belling operation.

In the particular example illustrated in FIGS. 8 and 9, the undulating surface on the outer contact surface of the backup collar forms a series of wave-like crests 50 and troughs 52 when viewed in cross section. The wave troughs are defined as smoothly sloping arcuate surfaces located between adjacent wave crests in cross section, the arcuate surfaces being drawn on a radius ("R" in FIG. 9) which ranges from about 3-50 mm for the example shown. While the pattern of crests and troughs illustrated in the preferred surface shown in FIGS. 8 and 9 are formed by smooth arcuate radii, it will be appreciated that the undulating surface could take other forms as well. For example, the undulating surface could form a series of V-shaped "threads" when viewed in cross section.

Other variations in the practice of the method of the invention will also be possible. For example, while the invention has been described with reference to a single internal groove formed within the female bell pipe end, it will be understood that two or more grooves can be formed in the bell pipe end while utilizing the improved backup collar of the invention.

In the preferred form of the invention illustrated in FIG. 9, the undulating surface on the outer contact surface of the backup collar 40 forms a series of evenly spaced waves with crests and troughs when viewed in cross section, and wherein there is an even spacing between troughs defined between mid-points of the troughs. This even spacing between mid points (illustrated as "A" in FIG. 9) is generally in the range from about 3-20 mm. The crests of the spaced waves have a given width (illustrated as "B" in FIG. 9), the width being in the range from about 0.01 and 8 mm for the example shown. The waves have a crest height as measured from an adjacent wave trough, the crest height (illustrated as "C" in FIG. 9) being in the range from about 0.3-3.0 mm.

While the above dimensions are given as being exemplary of a working example of the preferred embodiment of the invention, it will be understood that all of these values depend on the size of the backup collar itself. For example, a 1.2 meter collar will use the largest dimensions, while a 32 mm collar will use the smallest dimensions.

The preferred method of practicing the method of the invention will now be briefly described. The preferred method of the invention is used to install a gasket in a socket end of a thermoplastic pipe during a pipe belling operation where the pipe has a female socket end and a outer circumferential lip region. The preferred method comprises the following steps:

providing a mandrel with an inner end and an outer end and having an outer working surface;

installing a gasket at a first circumferential position on the outer working surface;

providing a backup collar at a second circumferential location on the mandrel, the backup collar having an exposed lip portion which abuts the gasket and an outer circumferential contact surface which contacts and supports the lip region of the pipe being belled;

heating a socket end of the thermoplastic pipe;

forcing the heated socket end of the thermoplastic pipe over the working surface of the mandrel and over the gasket and backup collar, whereby the heated socket end of the thermoplastic pipe flows over the gasket to form a retention groove for retaining the gasket;

retracting the backup collar;

cooling the heated socket end of the thermoplastic pipe;

retracting the cooled socket end of the thermoplastic pipe and the retained gasket from the working surface of the mandrel;

wherein the outer contact surface of the backup collar is provided with an undulating shape which reduces the surface area of the interface between the bell lip region and the contact surface area of the collar.

The method may also include the step of applying a vacuum to the heated, socket end of the thermoplastic pipe after the pipe has been forced over the working surface of the gasket and mandrel to thereby force the heated, socket end to contract about the mandrel and gasket.

The cooling step for cooling the heated bell pipe end may be performed by a water spray after the mandrel is retracted. The female pipe end may be heated, for example, by passing through a water bath in the temperature range from about 82 to 92° C. prior to contacting the gasket.

An invention has been provided with several advantages. The backup collar of the invention is preferably used in a pipe manufacturing process which provides a "gasket formed" bell groove, as in a Rieber style pipe belling operation where the groove is simultaneously formed as the bell pipe end is formed. In its most preferred form, the manufacturing method and device of the invention provide an improved seal system for plastic pipe joints utilizing the "gasket formed" bell groove, which does not require assembly in the field and which thus simplifies installation of pipe sections at the pipe joints used to form a fluid conveying pipeline.

The Rieber process itself provides an improved socket end for a pipe joint in which the sealing gasket is pre-stressed and anchored in position during the belling process at the pipe factory. The pre-stressed and anchored gasket which is installed integrally during the manufacturing process resists any tendency to twist or flip during field installation and resists the tendencies for impurities to enter the sealing zones of the joint. The improved backup collar of the invention helps to eliminate any tendency of the female, socket pipe end to buckle or otherwise cause belling problems during the manufacturing process. The apparatus of the invention is simple in design and economical to manufacture and can be easily adapted to existing equipment.

While the invention has been shown in several of its forms, it is not thus limited but is susceptible to various changes and modifications without departing from the spirit thereof.

What is claimed is:

1. A method of installing a gasket in a socket end of a thermoplastic pipe during a pipe belling operation where the pipe has a female socket end and a outer circumferential lip region, the method comprising the steps of:
   providing a mandrel with an inner end and an outer end and having an outer working surface;
   installing a gasket at a first circumferential position on the outer working surface;
   providing an unheated backup collar at a second circumferential location on the mandrel, the unheated backup collar having an exposed lip portion which abuts the gasket and an outer circumferential contact surface which contacts and supports the outer circumferential lip region of the thermoplastic pipe being belled;
   heating a socket end of the thermoplastic pipe;
   forcing the heated socket end of the thermoplastic pipe over the working surface of the mandrel and over the gasket and unheated backup collar, whereby the heated socket end of the thermoplastic pipe flows over the gasket to form a retention groove for retaining the gasket;
   retracting the unheated backup collar;
   cooling the heated socket end of the thermoplastic pipe;
   retracting the cooled socket end of the thermoplastic pipe and the retained gasket from the working surface of the mandrel;
   wherein the outer contact surface of the unheated backup collar is provided with an undulating shape which reduces the surface area of the interface between the outer circumferential lip region of the pipe female socket end and the contact surface area of the unheated backup collar, thereby reducing the coefficient of friction between the unheated backup collar and the outer circumferential lip region of the pipe female socket end and consequently eliminating the tendency of the pipe socket end to buckle or stick to the unheated backup collar.

2. The method of claim 1, further comprising the step of: applying a vacuum to the heated, socket end of the thermoplastic pipe after the pipe has been forced over the working surface of the gasket and mandrel to thereby force the heated, socket end to contract about the mandrel and gasket.

3. The method of claim 2, wherein the heated thermoplastic pipe is cooled by a water spray after the mandrel is retracted.

4. A method of installing a gasket in a socket end of a thermoplastic pipe during a pipe belling operation where the pipe has a female socket end and a outer circumferential lip region, the method comprising the steps of:
   providing a mandrel with an inner end and an outer end and having an outer working surface;
   installing a gasket at a first circumferential position on the outer working surface;
   providing a backup collar at a second circumferential location on the mandrel, the backup collar having an exposed lip portion which abuts the gasket and an outer circumferential contact surface which contacts and supports the lip region of the pipe being belled;
   heating a socket end of the thermoplastic pipe;
   forcing the heated socket end of the thermoplastic pipe over the working surface of the mandrel and over the gasket and backup collar, whereby the heated socket end of the thermoplastic pipe flows over the gasket to form a retention groove for retaining the gasket;
   retracting the backup collar;
   cooling the heated socket end of the thermoplastic pipe;
   retracting the cooled socket end of the thermoplastic pipe and the retained gasket from the working surface of the mandrel;
   wherein the outer contact surface of the backup collar is provided with an undulating shape which reduces the surface area of the interface between the bell lip region and the contact surface area of the collar;
   further comprising the step of: applying a vacuum to the heated, socket end of the thermoplastic pipe after the pipe has been forced over the working surface of the gasket and mandrel to thereby force the heated, socket end to contract about the mandrel and gasket;
   wherein the heated thermoplastic pipe is cooled by a water spray after the mandrel is retracted;
   wherein the thermoplastic pipe is heated by a water bath in the temperature range from about 82 to 92° C. prior to contacting the gasket.

5. The method of claim 4, wherein the undulating surface on the outer contact surface of the backup collar forms a series of crests and troughs when viewed in cross section.

6. The method of claim 1, wherein the undulating surface is a series of V-shaped threads when viewed in cross section.

7. The method of claim 1, wherein the undulating surface on the outer contact surface of the backup collar forms a series of evenly spaced waves with crests and troughs when viewed in cross section, and wherein there is an even spacing between troughs defined between mid-points of the troughs, the spacing between mid points being in the range from about 3-20 mm.

8. The method of claim 7, wherein the crests of the spaced waves have a given width, the width being in the range from about 0.01 and 8 mm.

9. The method of claim 7, wherein the waves have a crest height as measured from an adjacent wave trough, the crest height being in the range from about 0.3-3.0 mm.

10. The method of claim 7, wherein the wave troughs are defined as arcuate surfaces located between adjacent wave crests in cross section, the arcuate surfaces being drawn on a radius which ranges from about 3-50 mm.

* * * * *